United States Patent
Hertaus

(12) 
(10) Patent No.: US 10,264,909 B2
(45) Date of Patent: Apr. 23, 2019

(54) TWO PART POUR OVER FILTER

(71) Applicant: Vision Home Products, Inc., Le Sueur, MN (US)

(72) Inventor: Jacob Hertaus, Minneapolis, MN (US)

(73) Assignee: Vision Home Products, Inc., Le Sueur, MN (US)

(*) Notice: Subject to any disclaimer, the term of this patent is extended or adjusted under 35 U.S.C. 154(b) by 192 days.

(21) Appl. No.: 15/255,803

(22) Filed: Sep. 2, 2016

(65) Prior Publication Data
US 2018/0064283 A1  Mar. 8, 2018

(51) Int. Cl.
*A47J 31/06* (2006.01)
*A47J 31/20* (2006.01)

(52) U.S. Cl.
CPC ........... *A47J 31/0626* (2013.01); *A47J 31/20* (2013.01)

(58) Field of Classification Search
None
See application file for complete search history.

(56) References Cited

U.S. PATENT DOCUMENTS

| | | | | |
|---|---|---|---|---|
| 338,804 | A * | 2/1966 | Hester | |
| 3,587,444 | A * | 6/1971 | Godel | A47J 31/106 99/282 |
| 3,695,168 | A * | 10/1972 | Van Brunt | A47J 31/02 99/306 |
| 4,328,740 | A * | 5/1982 | McDonough | A47J 31/0621 99/285 |
| 4,875,408 | A * | 10/1989 | McGee | A47J 31/057 426/433 |
| 5,852,966 | A * | 12/1998 | Hursh | A47J 31/06 99/323 |
| 6,572,036 | B2 * | 6/2003 | Glucksman | A47J 42/42 241/100 |
| 6,575,081 | B2 * | 6/2003 | Kanba | A47J 31/0605 99/299 |
| 8,180,204 | B2 * | 5/2012 | Glucksman | A47J 31/057 392/328 |
| 9,747,797 | B1 * | 8/2017 | Ghosh | G08G 1/144 |

* cited by examiner

*Primary Examiner* — Ana M Fortuna
(74) *Attorney, Agent, or Firm* — Haugen Law Firm PLLP

(57) ABSTRACT

A pour over filter is described, that is suitable for brewing a single serving of coffee, tea or other like beverages. The filter apparatus of the invention is particularly well suited for percolating or drip brewing coffee or tea into a serving cup. The apparatus includes a filter assembly having an interlocking annular flange that allows a user to elevate the filter assembly within the serving cup or to submerge the filter assembly within the drinking cup.

20 Claims, 14 Drawing Sheets

TWO PART POUR OVER FILTER

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to beverage filters for brewing a drink. More particularly, the invention pertains to a reusable beverage filter system that contains coffee grounds, tea leaves or the like while the filter is immersed in hot water or while hot water is poured through the filter. The beverage filter of the present invention is particularly well suited to be suspended from a top ledge of a cup while a hot fluid is poured through the filter.

BACKGROUND

Generally, different brew methods have been implemented over the years to create, for example, distinct brews of tea and coffee. Hot water is typically combined with coffee grounds or tea leaves to extract soluble compounds and oils from allocated portions of coffee grounds or tea leaves. Depending upon the desired concentration of beverage, the allotted portions of coffee grounds or tea leaves may be percolated (decocted) or steeped (infused) to affect the resulting brew. For example, soaking finely ground coffee grinds with water at water temperatures of 194-205° F. yields a brew having a different physical and chemical constitution as compared to a brew resulting from 205° F. water that is gravity fed through coarse coffee grounds.

In recent years disposable containers having a preselect amount of ground coffee or tea leaves contained therein have been utilized in single serve gravitational steeping or percolating machines. In order to reduce the amount of disposable waste, some prefer to utilize reusable, small, single serve containers in single serve coffee maker. Use of the small containers may require reduced flow rates and the resulting brew may have a reduced amount of dissolved solids as compared to conventional gravity fed percolation. Also, a user may desire to reduce the brew time while maximizing the amount of soluble compounds and oils extracted from the coffee grinds or tea leaves. Further, it may be desirable to eliminate the need for a separate coffee making machine or percolator.

SUMMARY

Embodiments according to aspects of the invention provide a filter assembly that allows a user to brew a beverage directly into a cup without the need for an additional percolator or gravity fed electric beverage maker. Further aspects of the invention include a combination filter assembly that allows the user to either decoct or infuse coffee grounds, tea leaves or the like directly into a cup.

According to aspects of the invention, an embodiment of the invention includes a filter assembly, an annular ring extending outward from a mid-portion of the filter assembly, and a drip dish. The filter assembly includes a rigid framework and a filter media coupled to the rigid framework. The framework has an open top end, a bottom end having partitioned openings, and a concentric conical sidewall extending from the bottom end. The sidewalls have apertures extending there through and the filter media covers both the partitioned openings and the apertures. The filter media further impedes flow of fluid through both the partitioned openings and the apertures. Cylindrical projections extend outwardly from the sidewalls of the framework interlock with slots formed in the ring. The outer diameter of the ring is selectable to be larger than an upper ledge of a selected drinking. Further, the ring includes orifices extending through the ring to allow an overflow of fluids from the filter to drain into a selected drinking cup.

Aspects of the invention may include a drip dish having an interior cavity adapted to receive the bottom end of the framework. The drip dish may have an interior cavity adapted to receive the bottom end of the framework. Also, the drip dish may include ridges extending upward from the interior cavity of the drip dish. A handle may extend from an exterior side of said drip dish. Additionally, a handgrip may extend outward from the framework. When a user desires to elevate the filter above the drinking cup as fluid is poured through the projections, the annular ring is interlocked with the framework and a distance from the cylindrical projections to the bottom end of the framework is less than a depth of the drinking cup. Alternatively, the framework may be constructed such that a distance from the open end of the framework to the bottom end of the framework is greater than a depth of the drinking cup.

Another embodiment according to aspects of the invention includes a slow seep beverage filter apparatus for filtering coffee, tea and the like. The apparatus includes a filter assembly, filter elevating annular ring, and a drip dish. The filter assembly includes a rigid framework and a filter media coupled to the rigid framework, wherein the framework has an open top end, a bottom end having partitioned openings, and a concentric conical sidewall extending from the bottom end. The sidewalls have apertures extending there through and the filter media covers both the partitioned openings and the apertures to impede flow of fluids through both the partitioned openings and the apertures. Cylindrical projections extend outward from the sidewalls of the framework that interlock with slots formed in the annular ring. Also, the drip dish has an interior cavity adapted to receive the bottom end of said framework.

The embodiment may further include an outer diameter of the annular ring is selected to be larger than an upper ledge of a selected drinking cup. When the filter apparatus is positioned on a cup, the bottom of the flange rest on a top ledge of the cup. In this manner a bottom portion of the filter may be suspended in a drinking cup without touching the bottom of the cup. The annular ring may further include orifices extending through the ring to allow an overflow of fluid from the filter to drain into the selected drinking cup rather than spilling over the sides of the cup. The drip dish may have an interior cavity adapted to receive the bottom end of the framework. Also, the drip dish may ridges extending upward from the interior cavity of the drip dish. The ridges elevate the filter framework from the interior cavity floor to allow remnant fluids to drain out of the filter. Additionally, a handle may extend from an exterior side of the drip dish and a handgrip may extend outward from the framework to allow a user to carry the drip dish and framework either together or separately.

Another embodiment according to aspects of the invention includes a filter assembly, an annular ring and a drip dish. The filter assembly includes a rigid framework and a filter media coupled to the rigid framework. The framework has an open top end, a bottom end having partitioned openings, and a concentric conical sidewall extending from the bottom end. The sidewalls have apertures extending there through and the filter media covers both the partitioned openings and the apertures. In this manner the filter media impedes flow through both the partitioned openings and the apertures. Also, handgrips extend outward from the filter assembly and cylindrical projections extending outwardly from the sidewalls of the framework. The annular ring has slots formed in the ring which are adapted to receive and interlock with the cylindrical projections of the framework. Further, an outer diameter of the ring is selectable to be larger than an upper ledge of a selected drinking cup. Orifices extend through the ring to allow fluid that overflows from the filter to drain into the selected drinking cup. The drip dish has an interior cavity adapted to receive the bottom end of the framework. A handle extends from an exterior side of the drip dish allowing a user to transport a used filter assembly without unwanted dripping.

According to aspects of the above described embodiment, the filter assembly may further include ridges extending upward from the interior cavity of the drip dish. Further, a distance from the cylindrical projections to the bottom end of the framework may be less than a depth of the drinking cup. Alternatively, a distance from the open end of the framework to the bottom end of the framework may be greater than a depth of the drinking cup.

The accompanying drawings, which are incorporated in and constitute a portion of this specification, illustrate embodiments of the invention and, together with the detailed description, serve to further explain the invention. The embodiments illustrated herein are presently preferred, however, it should be understood that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
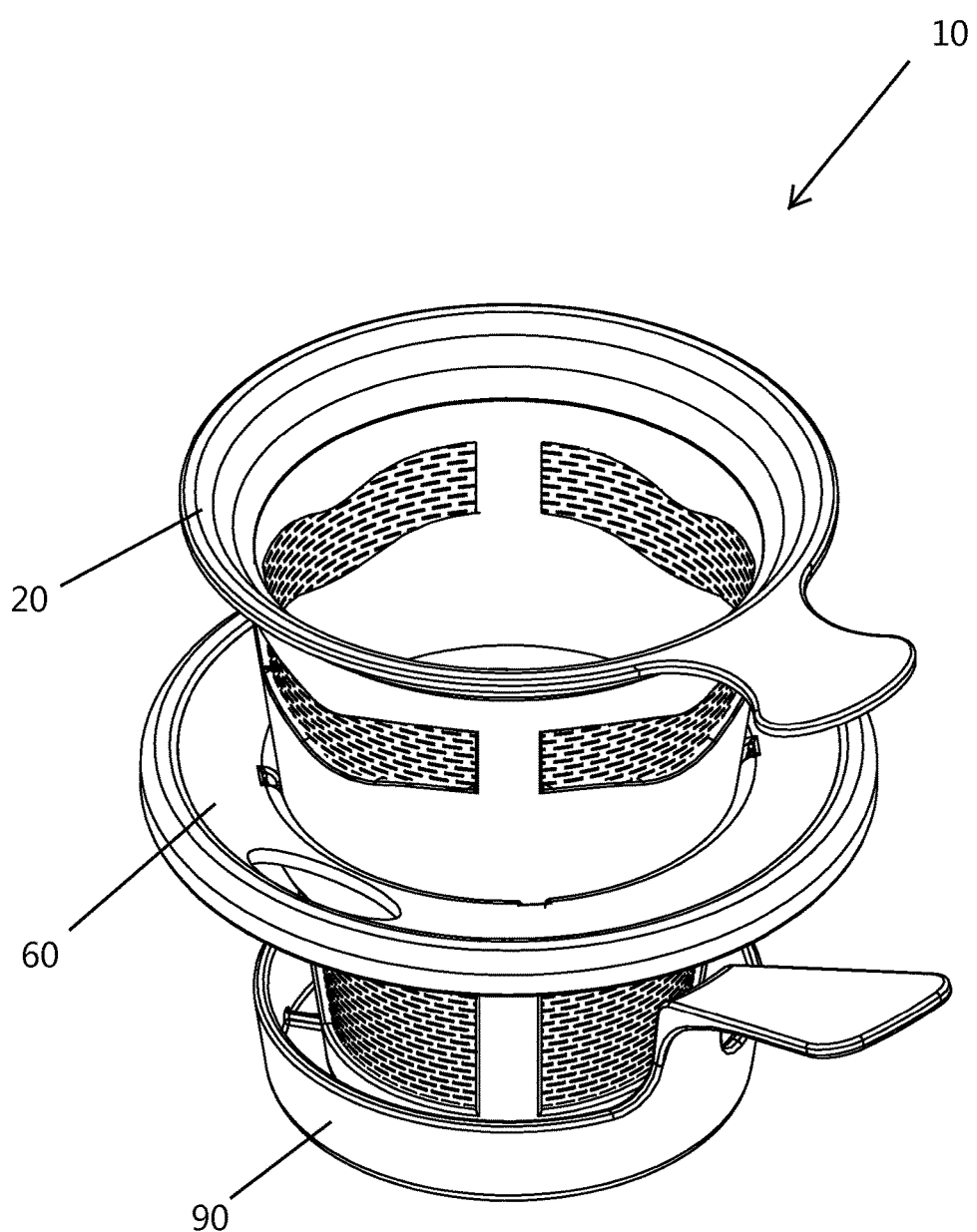
FIG. 1 is a top front perspective view of an assembled filter apparatus of the present invention.
Figure 2:
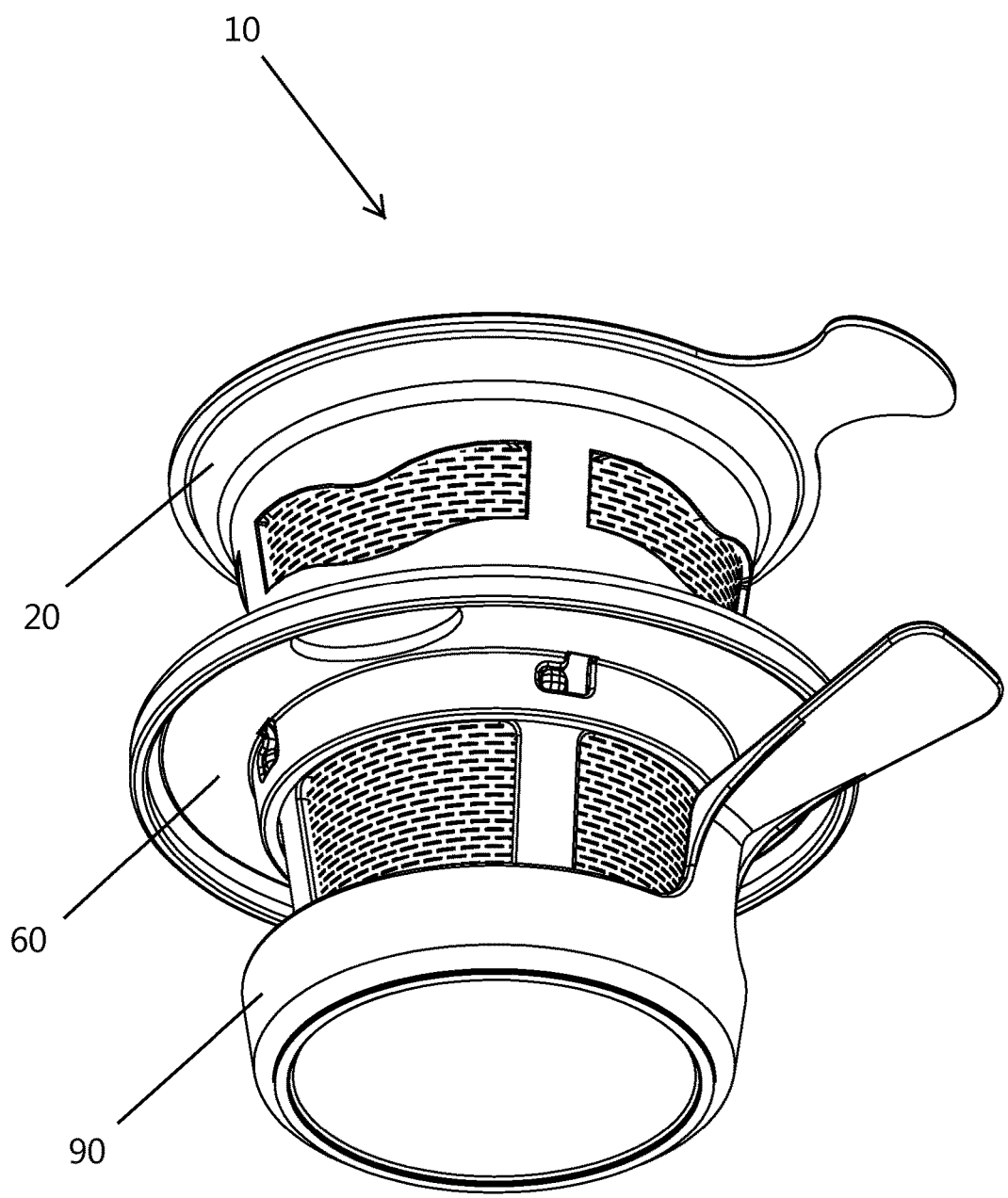
FIG. 2 is a bottom front perspective view of an assembled filter apparatus of the type shown in FIG. 1.
Figure 3:
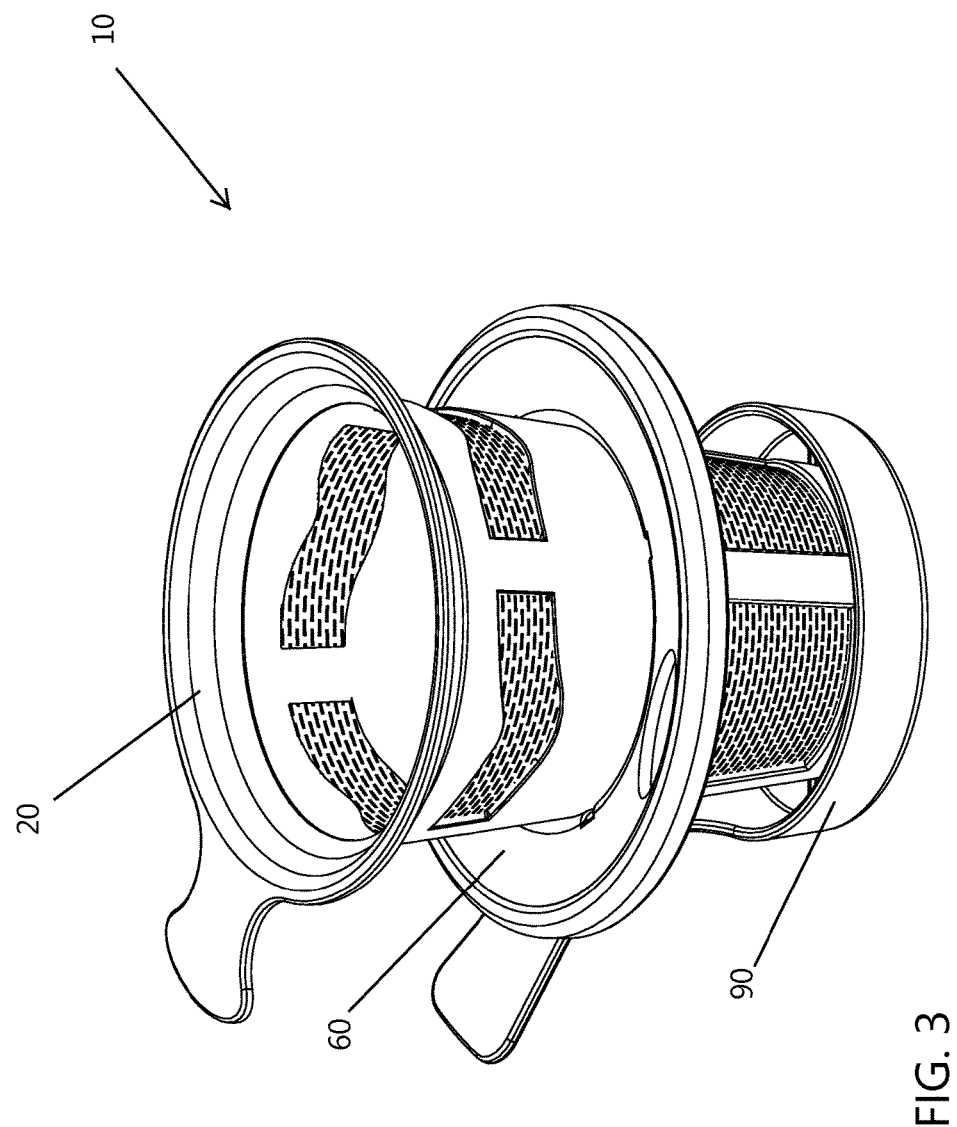
FIG. 3 is a top back perspective view of an assembled filter apparatus of the type shown in FIG. 1.
Figure 4:
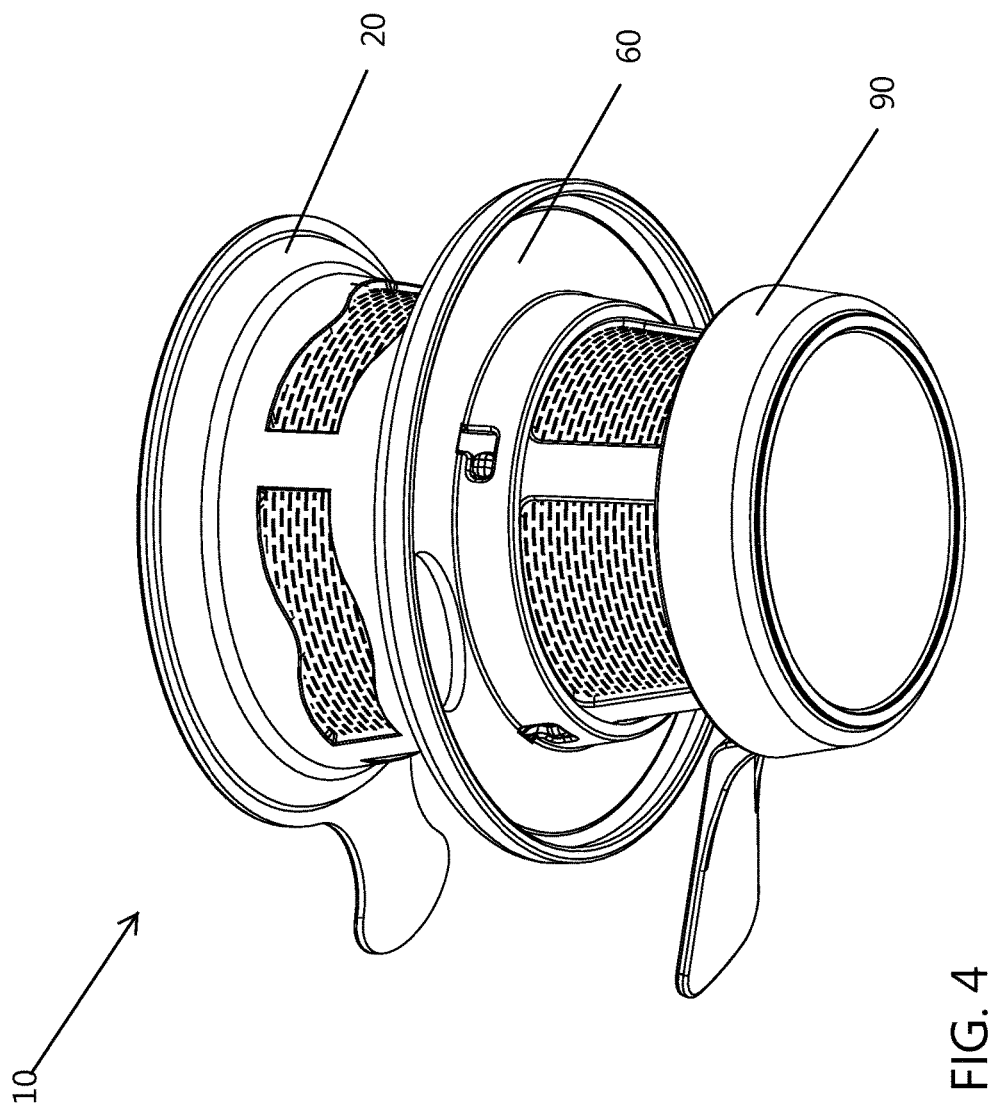
FIG. 4 is a bottom back perspective view of an assembled filter apparatus of the type shown in FIG. 1.
Figure 5:
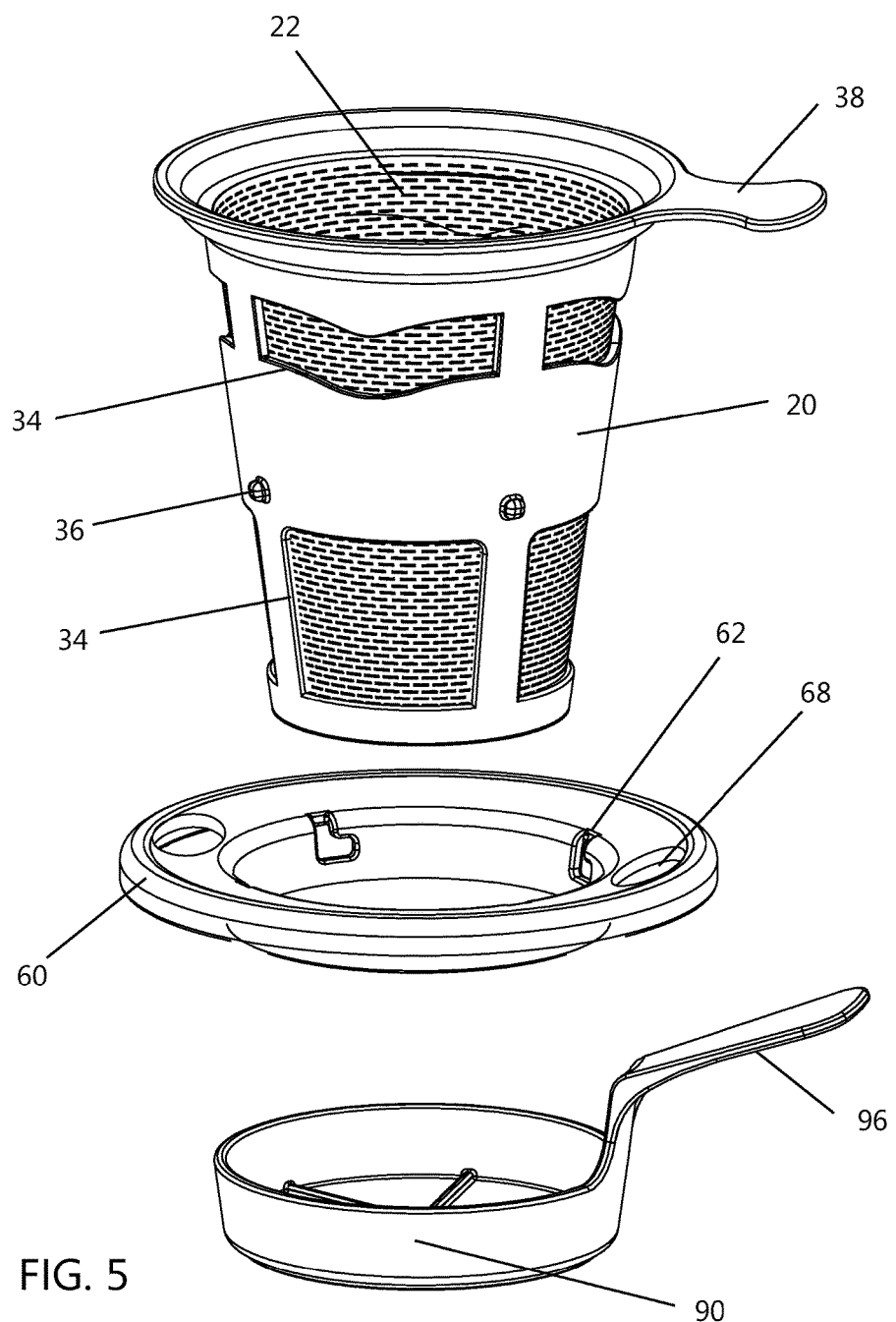
FIG. 5 is a top front exploded perspective view of a filter apparatus of the present invention.
Figure 6:
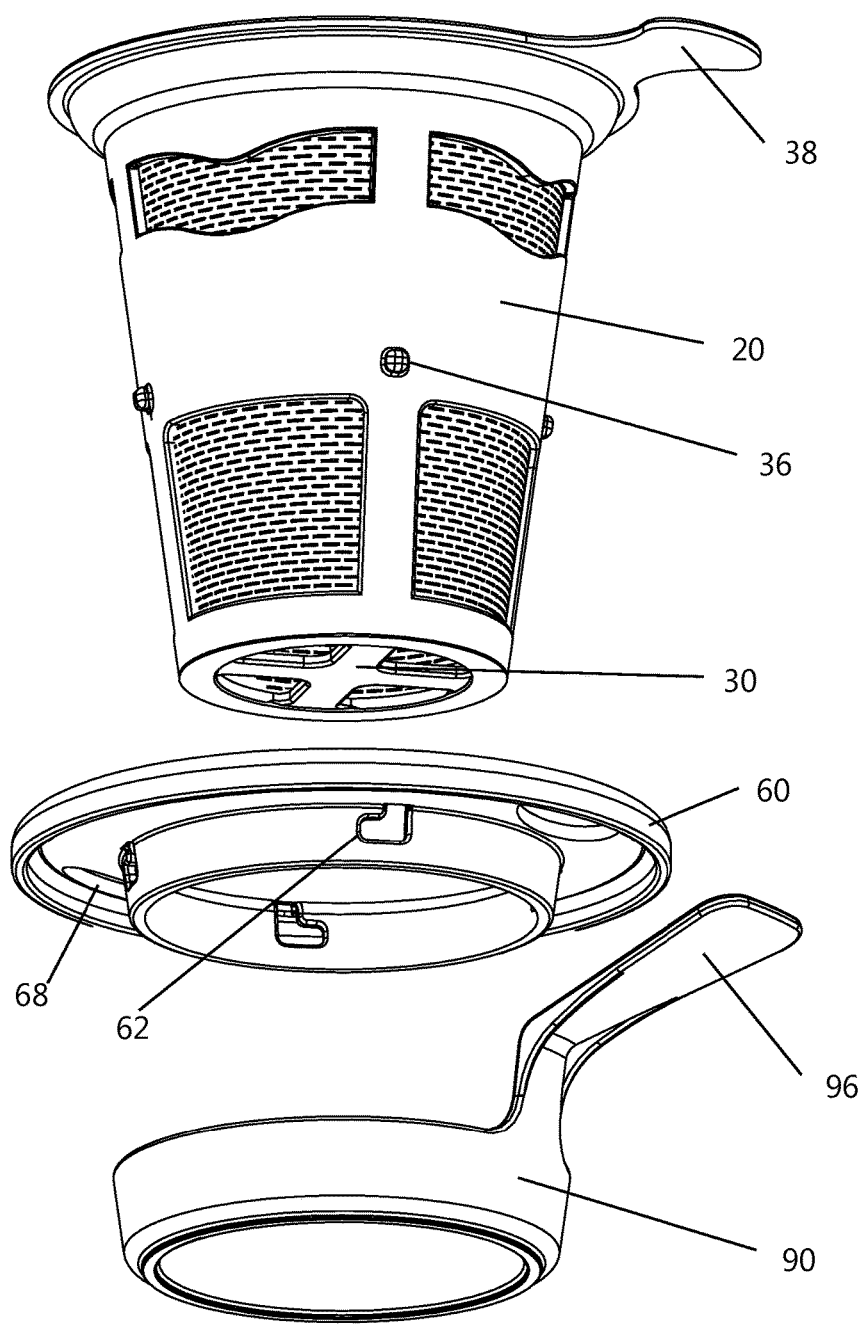
FIG. 6 is a bottom front exploded perspective view of a filter apparatus of the present invention.
Figure 7:
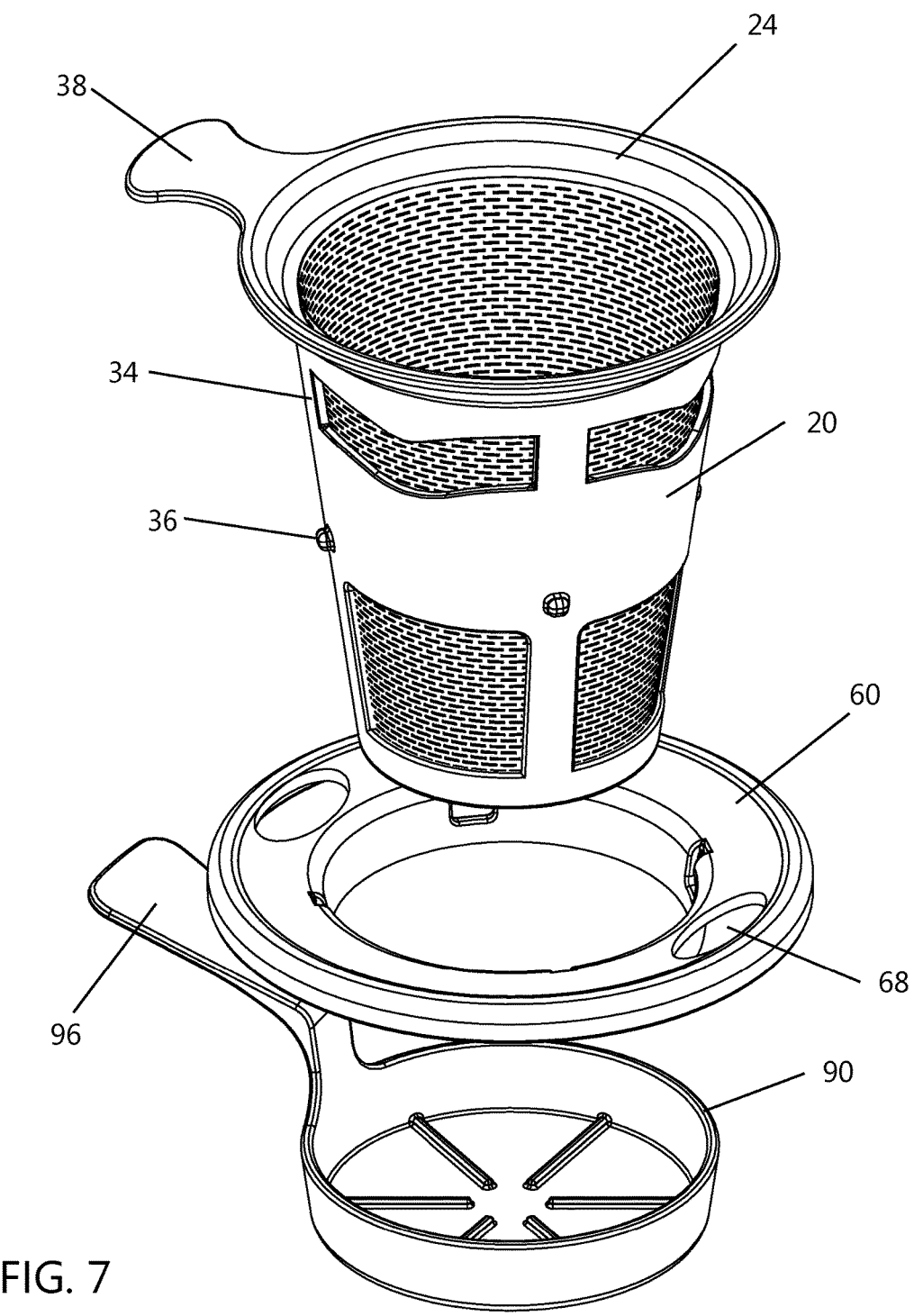
FIG. 7 is a top back exploded perspective view of a filter apparatus of the present invention.
Figure 8:
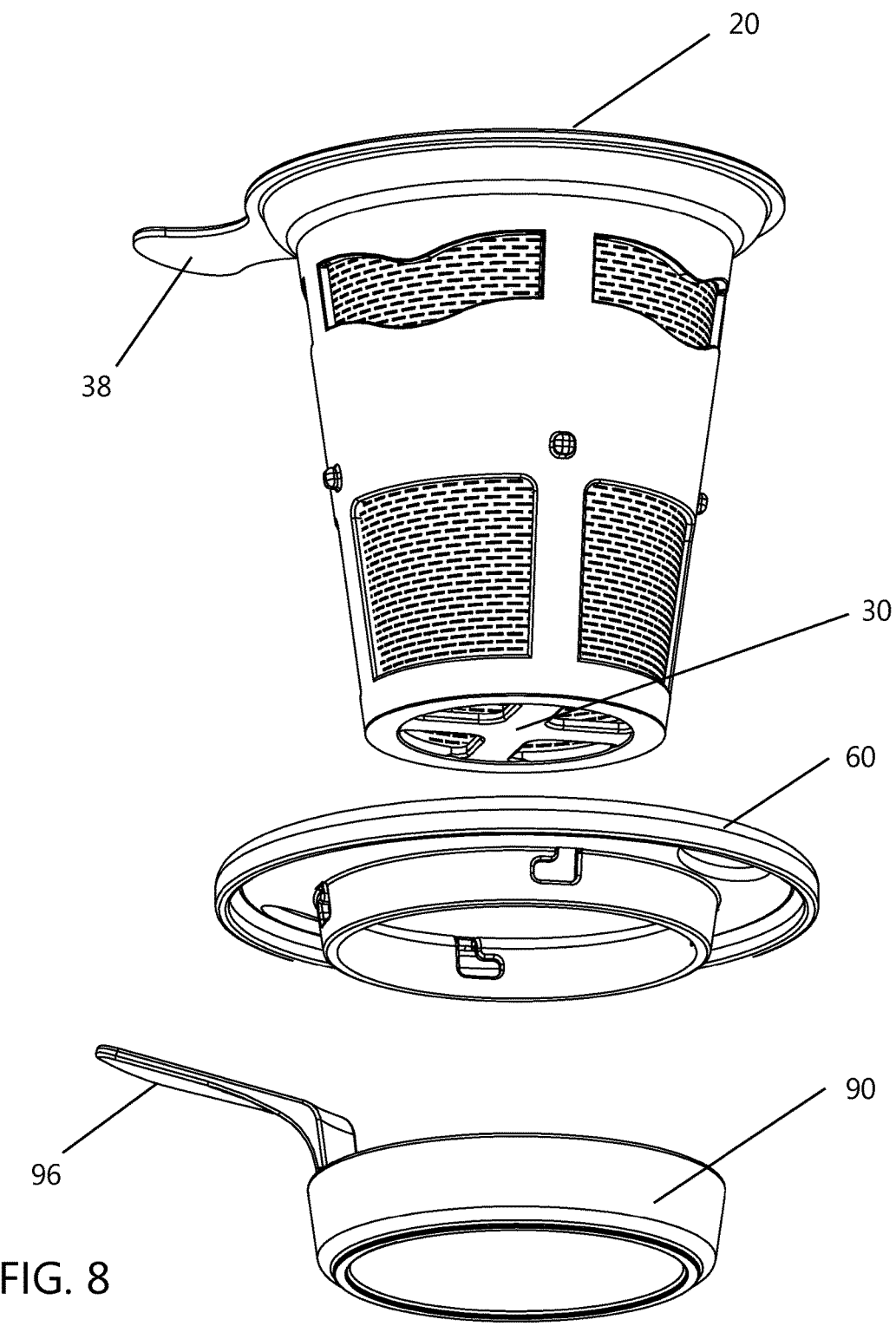
FIG. 8 is a bottom back exploded perspective view of a filter apparatus of the present invention.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The filter apparatus 10 of the present invention is particularly well suited for brewing coffee, tea, and the like. The filter apparatus 10 has three primary components, a filter assembly 20, an interchangeable and interlocking annular ring 60, and a drip dish 90. With reference to the Figures, various embodiments according to aspects of the invention will be described in greater detail. FIGS. 1-4 illustrate the complete filter apparatus 10 having the annular ring 60 interlocked with the filter assembly 20 and the drip dish 90 positioned under the filter assembly 20. Cylindrical projections 36 extend from rigid framework 24 and are sized to snuggly slide within slots 62 formed in the annular ring 60. Slot 62 is shaped so that the annular ring is pressed onto the projections 36 and then rotated to lock the annular ring onto the framework 24.

FIGS. 5-8 illustrates the filter apparatus 10 having the annular ring 60 removed from the filter assembly 20 and having the filter assembly 20 elevated above the drip dish 90. To remove the annular ring 60 from the filter assembly, a user twists or rotates the ring 60 in a clockwise direction (from a top perspective) while holding the filter assembly 20 stationary and then slides the ring 60 down and away from the filter assembly 20. Multiple annular rings 60 may be provided having varying outer diameters. In this manner a user may select the size of annular ring 60 that is best suited for the size of a selected mug or cup. The alignment of the projections 36 on framework 24 may be modified to best match the depth of the selected mug or cup and the desired type of brewing.

Figure 9:
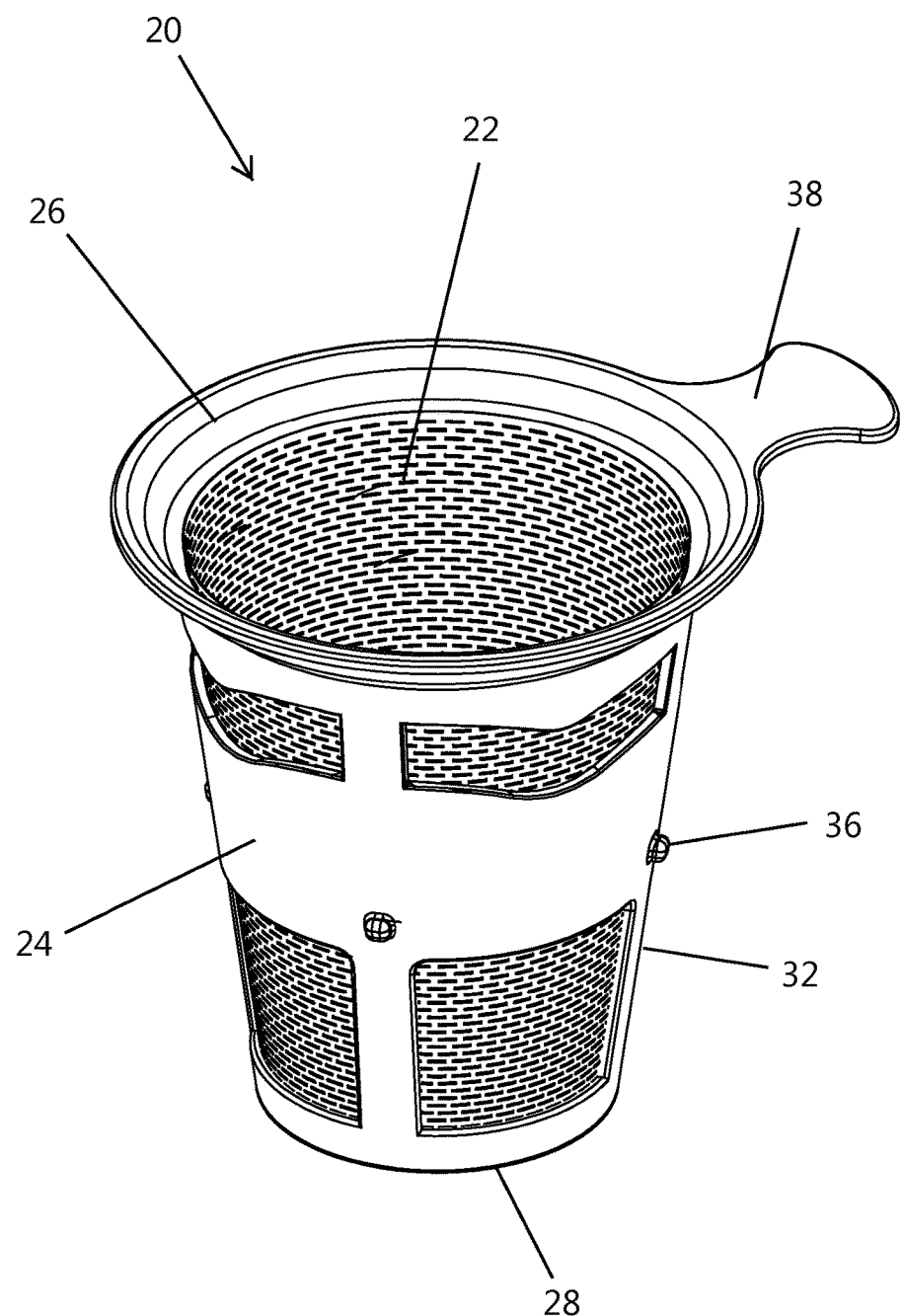
FIG. 9 is a top front perspective view of a filter assembly embodiment of the present invention.
Figure 10:
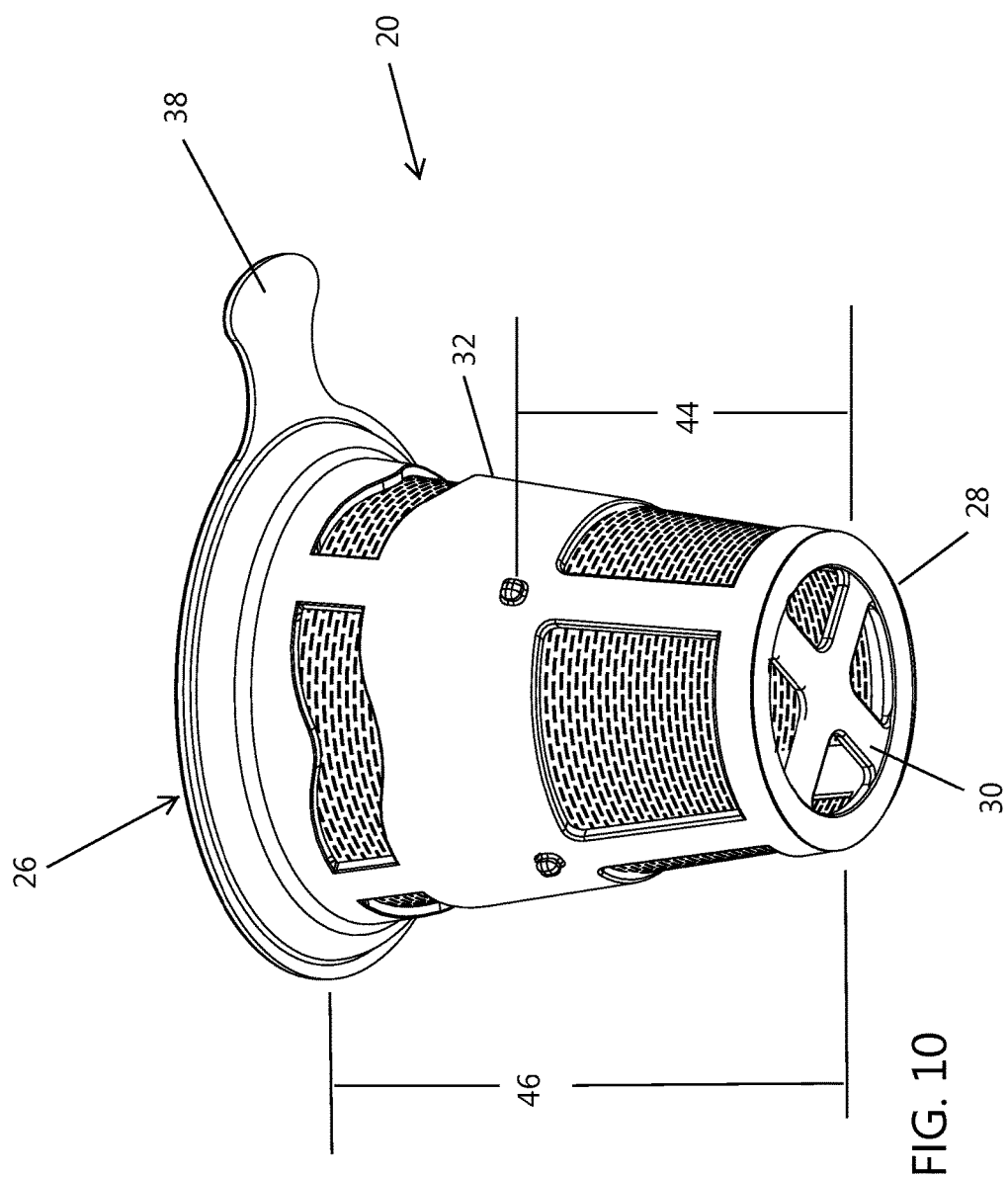
FIG. 10 is a bottom back perspective view of the filter assembly of the type shown in FIG. 9.

FIGS. 9 and 10 further illustrates the filter assembly 20. The filter assembly 20 includes filter media 22 and rigid framework 24. Framework 24 has an open top end 26, a bottom end 28, and a concentric conical sidewall 32 extending from the bottom end 28. The conical sidewall 32 has a smaller diameter near the bottom end 28 than the top end 26. The conical sidewalls direct fluid downwards towards the bottom end 28. Handgrip 38 extends from an upper edge of the sidewall 32. The handgrip 38 may be used to align the filter assembly 20 onto a selected cup and, when the annular ring 60 is removed, the handgrip 38 may rest on a top ledge of the cup.

The bottom end 28 of the framework 24 further includes partitioned openings 30 and the sidewall 32 includes apertures 34 that allow fluid to pass from an interior of the framework 24 to an exterior of the framework. Filter media 22 is coupled to the rigid framework 24 whereby the filter media 22 covers both the partitioned openings 30 and the apertures 34. The filter media may have varying properties depending upon the desired performance. By way of example, and without limitation, the pore size and thickness of the filter media 22 may be selected to impede flow through both the partitioned openings 30 and the apertures 34 and allow the desired rate of fluid flow and particle size through the filter 22.

Figure 11:
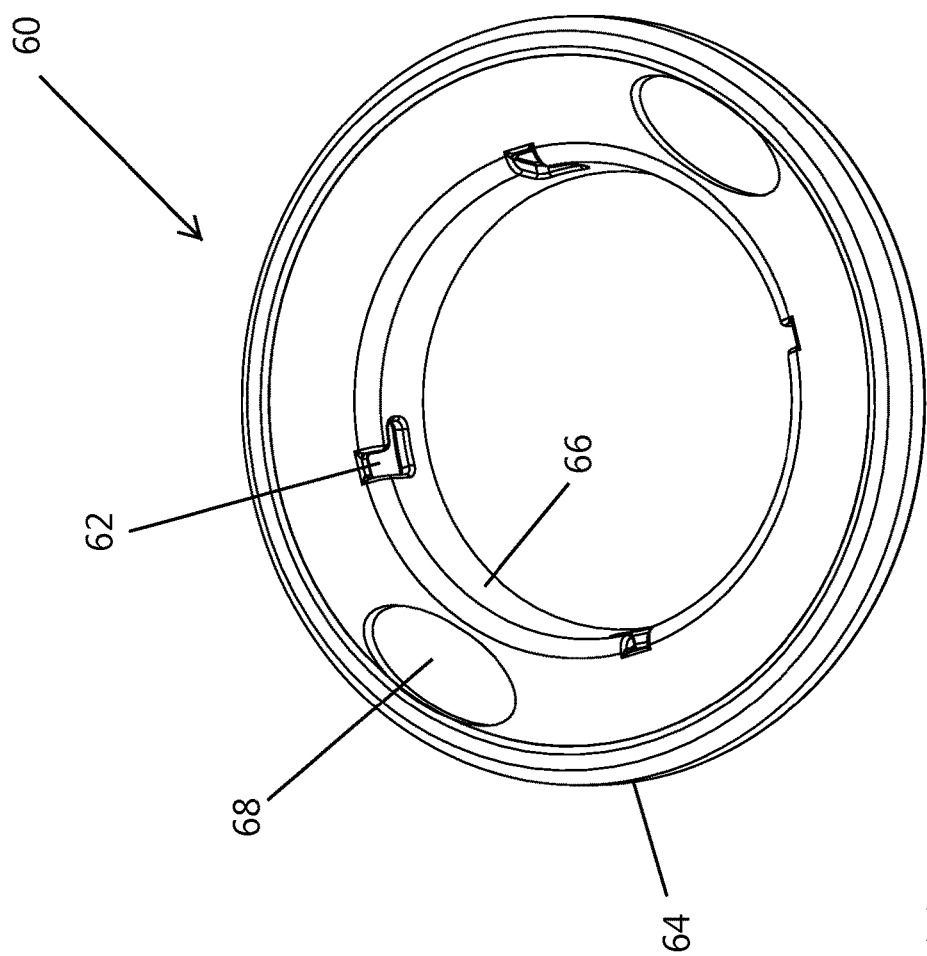
FIG. 11 is a front perspective view of an interlocking annular ring embodiment of the present invention.
Figure 12:
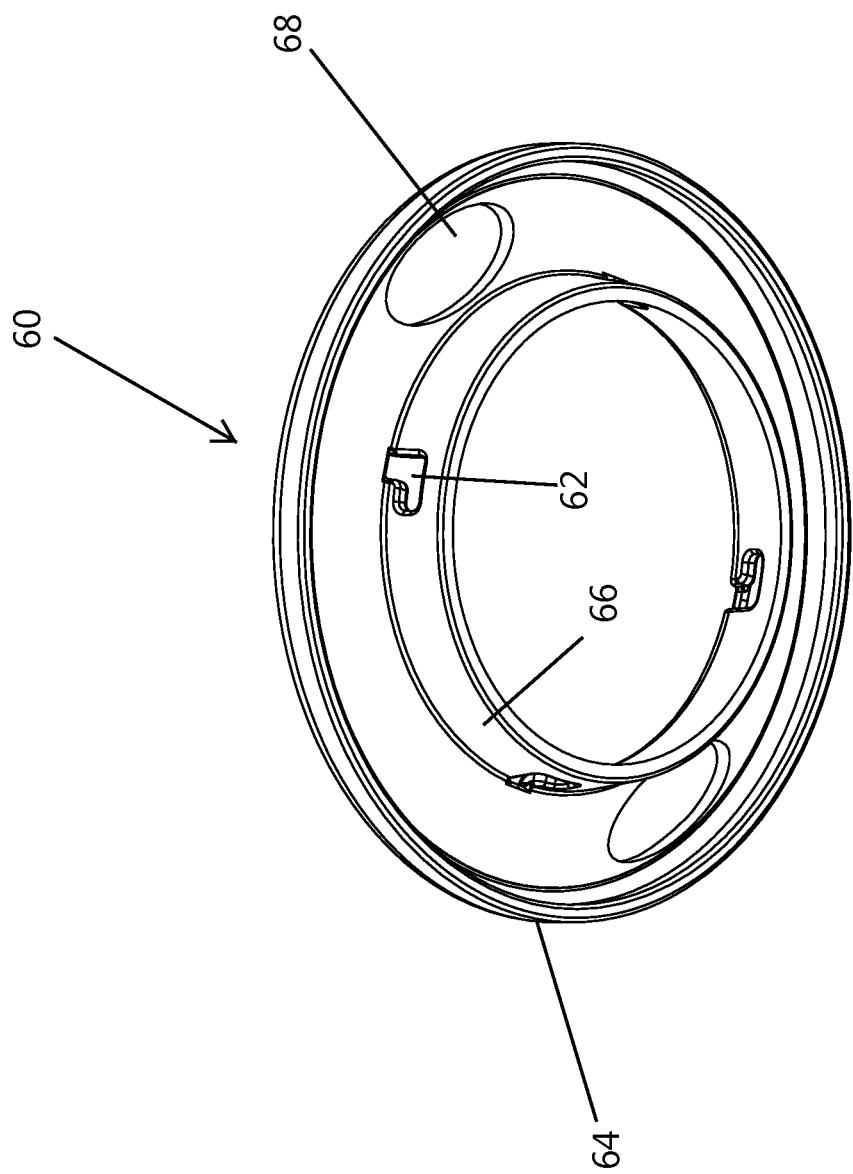
FIG. 12 is a bottom back perspective view of an interlocking annular ring of the type shown in FIG. 11.

FIGS. 11 and 12 further illustrates the annular ring 60. Spaced apart slots 62 are formed in ring 60 that are dimensioned to receive and interlock with said cylindrical projections 36 of the framework 24. The outer diameter of the ring 60 is selectable to be larger than an upper ledge of a selected drinking cup. Further, the ring 60 includes spaced apart orifices 68 extending through the ring 60 to allow fluid overflow from the filter 20 to drain into the selected drinking cup. Outer rim 64 preferably has a diameter greater than an outer diameter of a selected cup. The bottom of the ring 60 rests upon a top ledge of a selected cup. The bottom or under side of the ring 60 may further include an inner concentric annular flange 66 extending from the bottom of the ring. The outer diameter of the flange 66 is sized to be less than an inner diameter of a top ledge of a selected cup. In this manner, the flange 66 restricts the filter apparatus 10 from slipping off the cup.

Figure 13:
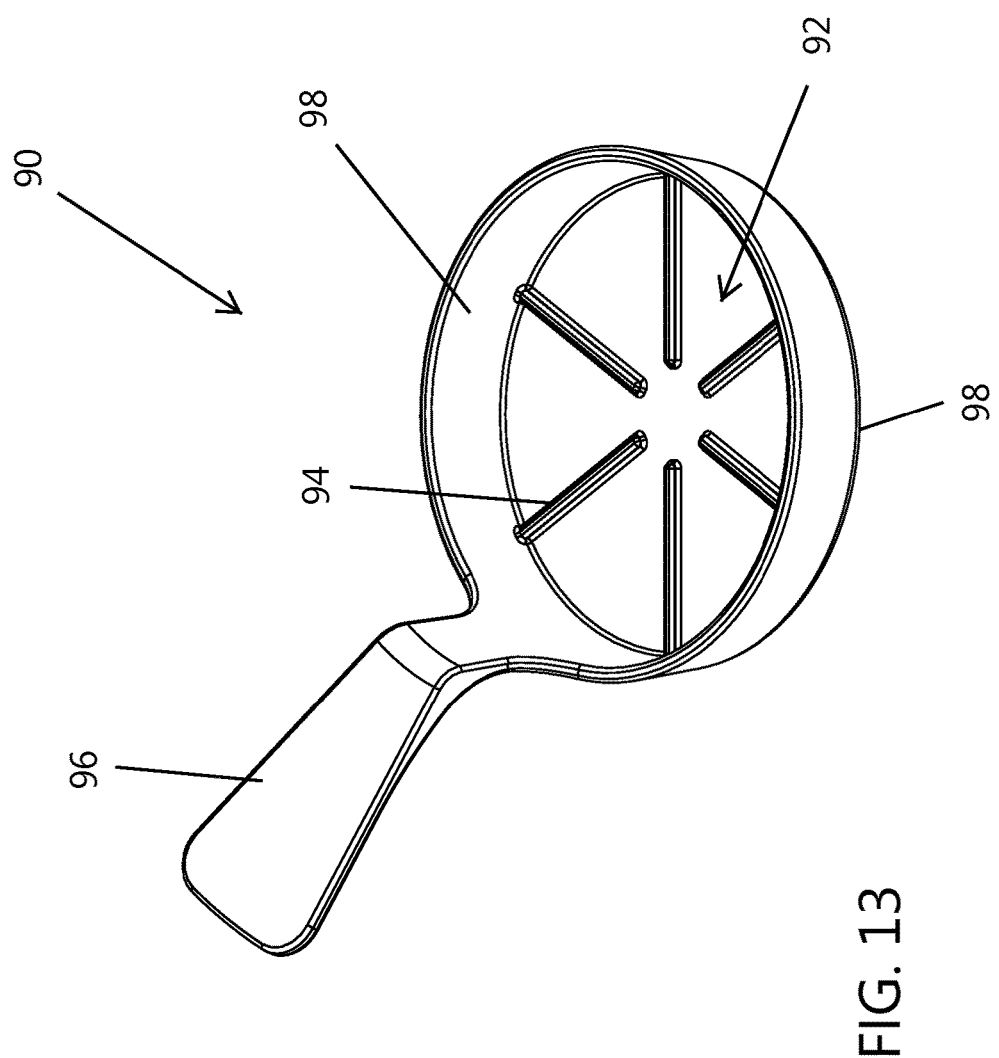
FIG. 13 is a front perspective view of a drip dish embodiment of the present invention.
Figure 14:
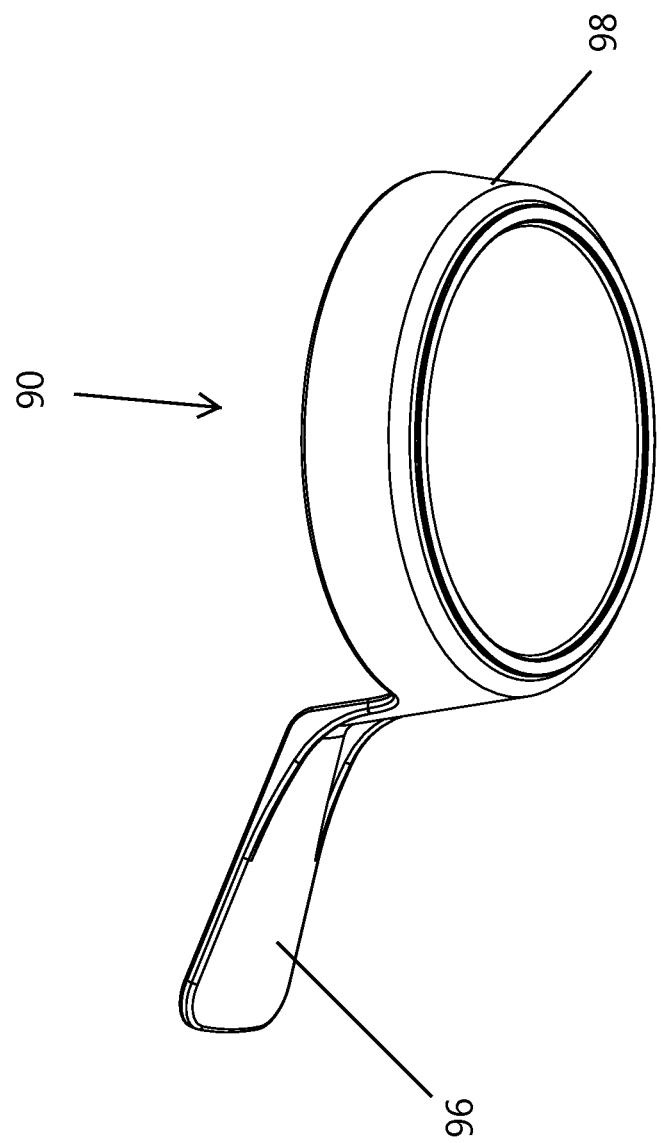
FIG. 14 is a bottom back perspective view of a drip dish of the type shown in FIG. 13.

FIGS. 13 and 14 further illustrate the drip dish 90. The drip dish 90 includes a base 98 onto which the filter assembly 20 may be placed. An interior cavity 92 may extend into the base 98 and is dimensioned to receive the bottom end 28 of said framework 24. Additionally, the interior cavity 92 may include ridges 94 extending upward from the interior cavity 92 of the drip dish 90. Also, a handle 96 extends from an exterior side of the base 98 of the drip dish 90. Handle 96 allows a user to transport the filter apparatus 10 that has been used to filter fluid through the media, without dripping residue from the filter during transport.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A beverage filter apparatus for filtering coffee, tea and the like, said apparatus comprising:
   a filter assembly including a rigid framework and a filter media coupled to the rigid framework, wherein said framework has an open top end, a bottom end having partitioned openings, and a concentric conical sidewall extending from the bottom end, said sidewalls having apertures extending there through, and wherein said filter media covers both said partitioned openings and said apertures to thereby restrict but not block flow through both said partitioned openings and said apertures;
   cylindrical projections extending outwardly from said sidewalls of said framework; and
   an annular ring having slots formed in said ring, said slots adapted to receive and interlock with said cylindrical projections of said framework, wherein an outer diameter of said ring is selectable to be larger than an upper ledge of a selected drinking cup and wherein said ring further includes orifices extending through said ring to allow fluid overflow from the filter to drain into the selected drinking cup.

2. The apparatus as recited in claim 1, further including a drip dish adapted to receive said filter assembly.

3. The apparatus as recited in claim 2, wherein said drip dish has an interior cavity adapted to receive said bottom end of said framework.

4. The apparatus as recited in claim 3, wherein said drip dish includes ridges extending upward from the interior cavity of said drip dish.

5. The apparatus as recited in claim 4, further including a handle extending from an exterior side of said drip dish.

6. The apparatus as recited in claim 1, further including a handgrip extending outward from the framework.

7. The apparatus as recited in claim 6, further wherein a distance from the open end of said framework to the bottom end of said framework is greater than a depth of the drinking cup.

8. The apparatus as recited in claim 1, wherein a distance from the cylindrical projections to the bottom end of the framework is less than a depth of the drinking cup.

9. A pour over and slow seep beverage filter apparatus for filtering coffee, tea and the like, said apparatus comprising:
   a filter assembly including a rigid framework and a filter media coupled to the rigid framework, wherein said framework has an open top end, a bottom end having partitioned openings, and a concentric conical sidewall extending from the bottom end, said sidewalls having apertures extending there through, and wherein said filter media covers both said partitioned openings and said apertures to thereby restrict but not block flow through both said partitioned openings and said apertures;
   cylindrical projections extending outwardly from said sidewalls of said framework;
   an annular ring having slots formed in said ring and adapted to receive and interlock with said cylindrical projections of said framework; and
   a drip dish adapted to receive said filter assembly.

10. The apparatus as recited in claim 9, wherein an outer diameter of said ring is selectable to be larger than an upper ledge of a selected drinking cup and wherein said ring further includes orifices extending through said ring to allow overflow of fluid from the filter to drain into the selected drinking cup.

11. The apparatus as recited in claim 10, further wherein a distance from the open end of said framework to the bottom end of said framework is greater than a depth of the drinking cup.

12. The apparatus as recited in claim 9, wherein said drip dish has an interior cavity adapted to receive said bottom end of said framework.

13. The apparatus as recited in claim 12, wherein said drip dish includes ridges extending upward from the interior cavity of said drip dish.

14. The apparatus as recited in claim 13, further including a handle extending from an exterior side of said drip dish.

15. The apparatus as recited in claim 9, further including a handgrip extending outward from the framework.

16. The apparatus as recited in claim 9, wherein a distance from the cylindrical projections to the bottom end of the framework is less than a depth of the drinking cup.

17. A pour over and slow seep beverage filter apparatus for filtering coffee, tea and the like, said apparatus comprising:
- a filter assembly including a rigid framework and a filter media coupled to the rigid framework, wherein said framework has an open top end, a bottom end having partitioned openings, and a concentric conical sidewall extending from the bottom end, said sidewalls having apertures extending there through, and wherein said filter media covers both said partitioned openings and said apertures to thereby restrict but not block flow through both said partitioned openings and said apertures;
- a handgrip extending outward from said filter assembly;
- cylindrical projections extending outwardly from said sidewalls of said framework;
- an annular ring having slots formed in said ring and adapted to receive and interlock with said cylindrical projections of said framework, wherein an outer diameter of said ring is selectable to be larger than an upper ledge of a selected drinking cup and wherein said ring further includes orifices extending through said ring to allow overflow of fluid from the filter to drain into the selected drinking cup;
- a drip dish adapted to receive said filter assembly, wherein said drip dish has an interior cavity adapted to receive said bottom end of said framework; and
- a handle extending from an exterior side of said drip dish.

18. The apparatus as recited in claim 17, wherein said drip dish includes ridges extending upward from the interior cavity of said drip dish.

19. The apparatus as recited in claim 17 wherein a distance from the cylindrical projections to the bottom end of the framework is less than a depth of the drinking cup.

20. The apparatus as recited in claim 19, further wherein a distance from the open end of said framework to the bottom end of said framework is greater than a depth of the drinking cup.

* * * * *